United States Patent [19]

Kurokawa et al.

[11] Patent Number: 4,695,069
[45] Date of Patent: Sep. 22, 1987

[54] STEERING SYSTEM FOR REAR WHEELS

[75] Inventors: Ryogo Kurokawa; Fusami Oyama, both of Gunma; Akira Takahashi, Ohta, all of Japan

[73] Assignee: Fuji Jukogyo Kabushiki Kaisha, Tokyo, Japan

[21] Appl. No.: 842,350

[22] Filed: Mar. 21, 1986

[30] Foreign Application Priority Data

Mar. 22, 1985 [JP] Japan .................................. 60-58101
Mar. 22, 1985 [JP] Japan .................................. 60-58102

[51] Int. Cl.$^4$ .......................... B62D 5/10; B62D 7/00
[52] U.S. Cl. ...................................... 280/91; 180/140; 280/99
[58] Field of Search .................. 280/95 R, 99, 91; 180/79, 157, 159, 160, 140

[56] References Cited

U.S. PATENT DOCUMENTS

| | | | |
|---|---|---|---|
| 3,279,813 | 10/1966 | Linsay | 280/91 |
| 3,315,759 | 4/1967 | Bohlen | 280/91 |
| 3,704,897 | 12/1972 | Bagge et al. | 280/91 |
| 3,853,069 | 12/1974 | Goodwin | 180/79 |
| 3,945,455 | 3/1976 | Hamada et al. | 180/79 |
| 4,553,768 | 11/1985 | Furukawa et al. | 280/91 |
| 4,600,205 | 7/1986 | Stewart et al. | 180/79 |
| 4,610,328 | 9/1986 | Kanazawa et al. | 280/91 |
| 4,613,144 | 9/1986 | Furukawa | 280/91 |

Primary Examiner—Richard A. Bertsch
Attorney, Agent, or Firm—Martin A. Farber

[57] ABSTRACT

A tubular cross-member is provided on a body of a motor vehicle in which a rack is slidably mounted. An outer control arm is rotatably connected on an end of the rack, and an inner control arm is rotatably supported on the cross-member. The other ends of both control arms are rotatably connected with each other by a kingpin. A rear wheel of the vehicle is rotatably mounted on a shaft secured to the outer control arm, and a steering drive device is provided to move the rack for steering.

19 Claims, 3 Drawing Figures

STEERING SYSTEM FOR REAR WHEELS

BACKGROUND OF THE INVENTION

The present invention relates to a rear-wheel steering system for a motor vehicle having front and rear steering systems.

Japanese Patent Laid Open No. 59-26363 discloses a rear-wheel steering system which is disposed behind a rear suspension system. Because the rear-wheel steering system is independent from the rear suspension system, the weight of the vehicle increases by an increase of the number of component parts and the construction becomes complicated. In addition, because the rear steering system is positioned under a rear trunk and a fuel tank, the space of the trunk is reduced and the position of the fuel tank is limited to a small range.

SUMMARY OF THE INVENTION

The object of the present invention is to provide a rear steering system which is simple in construction without a large increase of the weight of a motor vehicle and without reducing the space of a rear trunk.

The other objects and features of this invention will be apparently understood from the following description with reference to the accompanying drawings.

BRIEF DESCRIPTION OF THE PREFERRED EMBODIMENT

DETAILED DESCRIPTION OF THE PREFERRED EMBODIMENT

Figure 1:
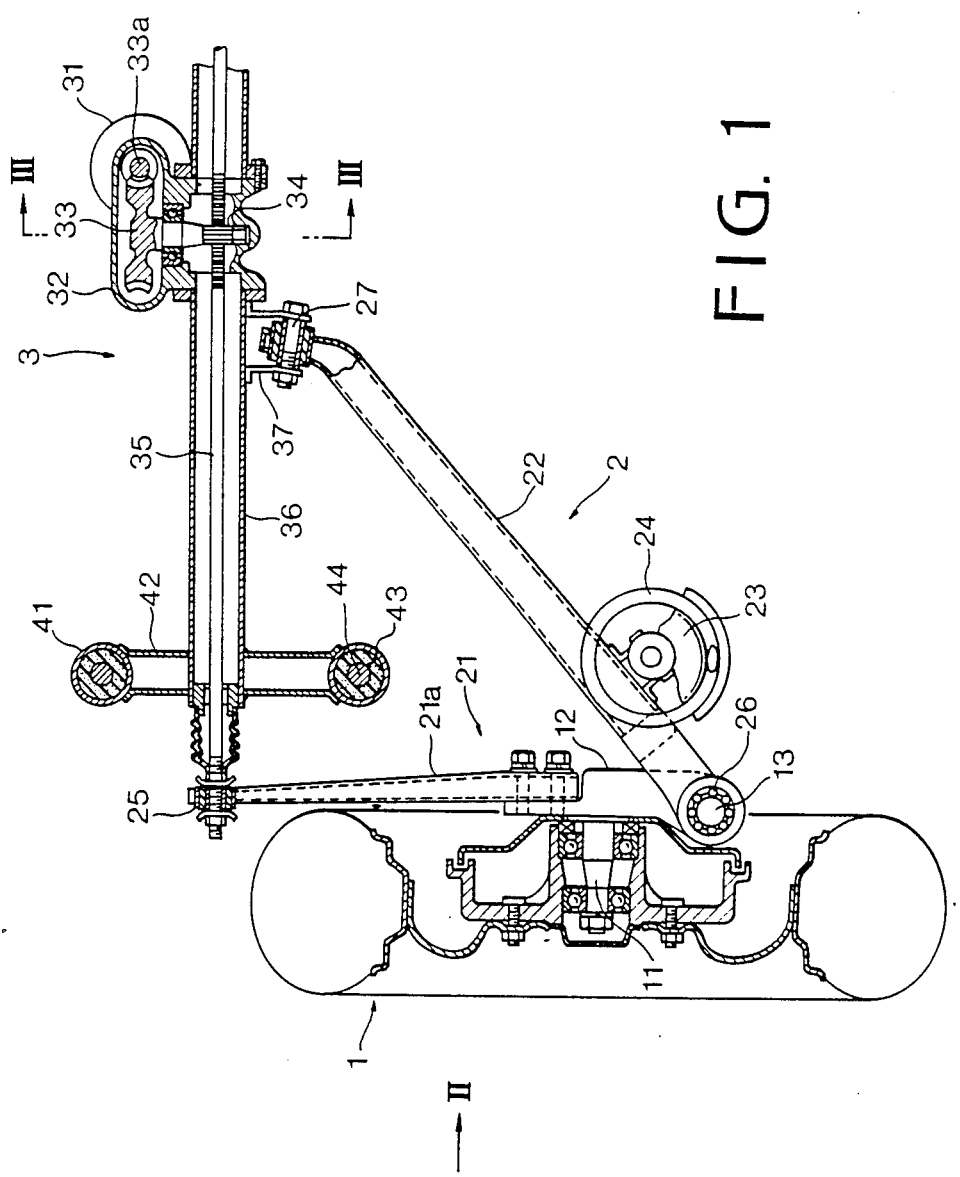
FIG. 1 is a plan view of a rear steering system according to the present invention.
Figure 2:
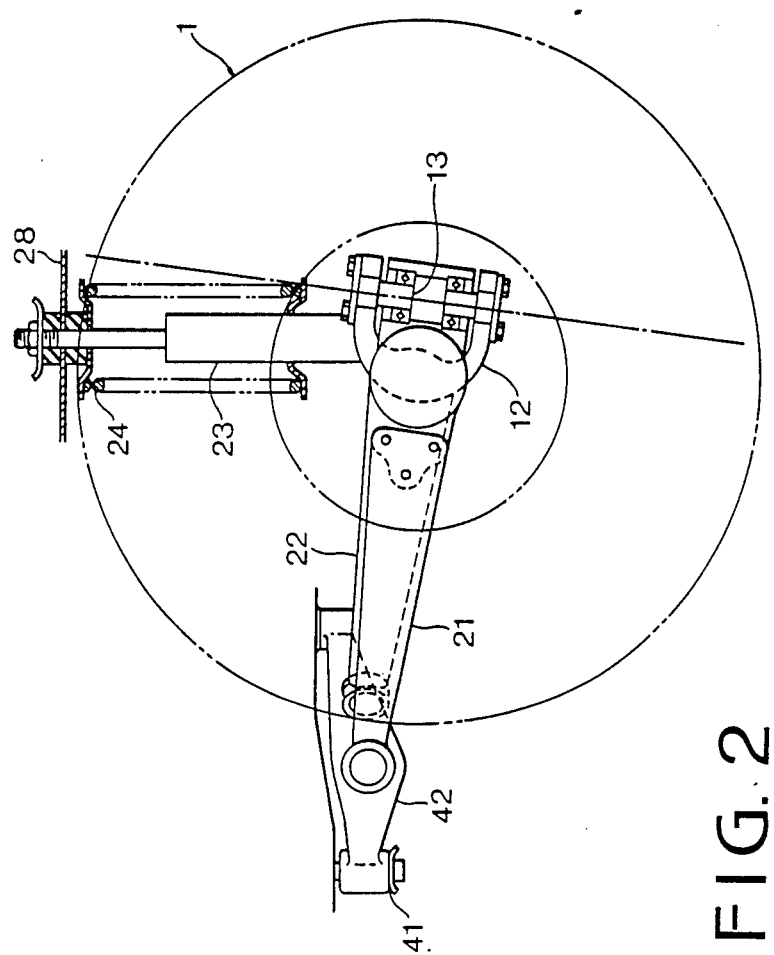
FIG. 2 is a side view of the steering system as viewed from an arrow II of FIG. 1.
Figure 3:
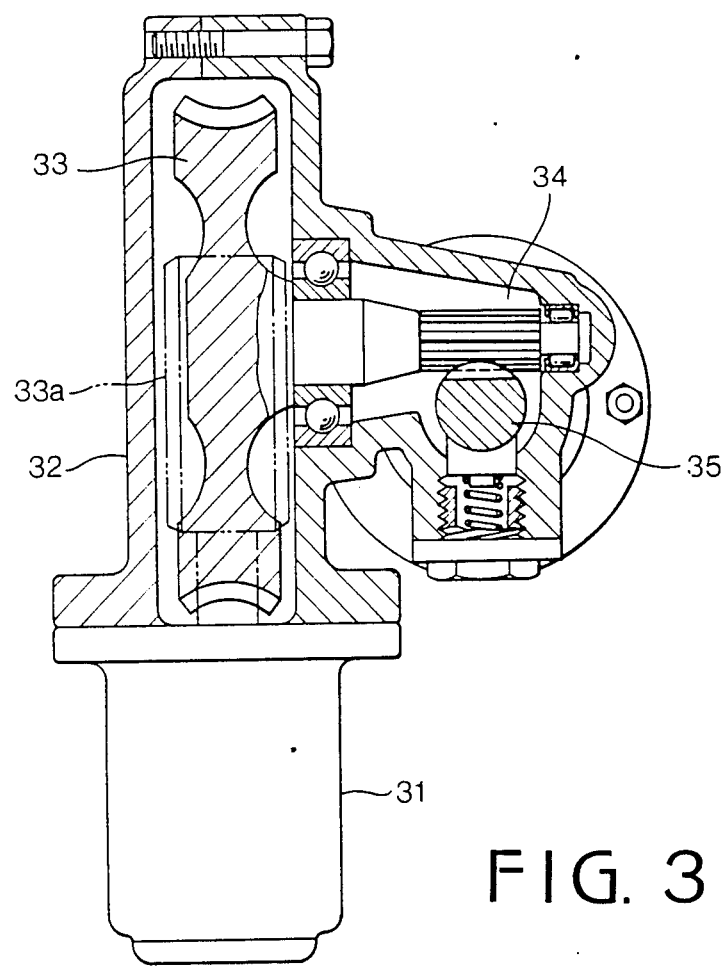
FIG. 3 is a sectional view taken along a line III—III of FIG. 1.

Referring to FIGS. 1 and 2, although the drawings show a system for one of the rear wheels 1 of a motor vehicle, the system for the other rear wheel is the same as the illustrated system. The system comprises a rear suspension system 2 of a semi-trailing arm type and a rear steering system 3. The suspension system 2 comprises an outer control arm 21 and an inner control arm 22, the outer control arm comprising an arm 21a and a knuckle portion 12 fixed to the arm 21a by bolts. The rear wheel 1 is rotatably mounted on a spindle 11 secured to the knuckle portion 12 of outer control arm 21. Mounted on an end of the knuckle 12 is a kingpin 13 on which the inner control arm 22 is rotatably mounted at an end thereof through a bearing 26. The front end of the outer control arm 21 is rotatably mounted on an end of a rack 35 through a bushing 25, and the front end of the inner control arm 22 is rotatably mounted on a shaft 27 secured to a tubular cross-member 36 through a bracket 37. The inner control arm 22 is connected to a frame or body 28 of the motor vehicle through a shock absorber 23 and a coil spring 24. Thus, a semi-trailing arm type suspension system is composed.

The cross-member 36 has a bracket 42 having a pair of cylinders 41 in each of which a cylindrical damper 43 is provided. The damper 43 engages with a rod 44 secured to the body 28, so that the cross-member 36 is attached to the body. The rack 35 is slidably mounted in the cross-member 36 and engages with a pinion 34 which is integral with a worm wheel 33 rotatably mounted in a gear box 32 secured to the cross-member 36. The worm wheel 33 engages with a worm 33a integral with a rotary shaft of a motor 31 attached to the gear box 32.

When the rack 35 is moved in the axial direction by the motor 31 through the worm 33a, worm wheel 33 and pinion 34, the outer control arm 21 is rotated about the kingpin 13, so that the rear wheel 1 is turned for steering. Although the outer control arm 21 consists of the arm 21a and knuckle portion 12, the control arm 21 may be a single member.

From the foregoing it will be understood that the present invention provides a rear steering system of simple construction, since the outer control arm serves as a knuckle arm pivoted about a kingpin. Since the steering system is positioned before the axles of the rear wheels, a large trunk may be provided and the position of a fuel tank is not limited.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A steering system for a motor vehicle having a body comprising:
    a cross-member attached to the body of the motor vehicle in the transverse direction;
    a movable member slidably disposed on the cross-member so as to be moved in the transverse direction;
    an outer control arm rotatably connected at one end thereof on an end of the movable member so as to swing in a vertical plane;
    a shaft secured to the outer control arm;
    a rear wheel of the vehicle rotatably mounted on said shaft;
    an inner control arm rotatably supported at an end thereof on the cross-member so as to swing in a vertical plane;
    a kingpin rotatably connecting other ends of both said control arms with each other so that said outer control arm is swingable in a horizontal plane;
    suspension means engaged with the inner control arm for elastically suspending the body of the motor vehicle; and
    means for moving the movable member so that the outer control arm turns about the kingpin for turning the rear wheel.

2. The system according to claim 1 wherein the movable member is a rack provided to be moved in the transverse direction.

3. The system according to claim 2 wherein the cross-member is tubular, and the rack is slidably mounted in the cross-member.

4. The system according to claim 2 the kingpin is secured to the outer control arm.

5. The steering system according to claim 1, wherein said one end of said inner control arm is pivoted substantially at a middle of said cross-member providing the rotatable support of said inner control arm for its swinging in a vertical plane.

6. The steering system according to claim 1, wherein said end of said movable member and said one end of said outer control arm are displaceable out of said transverse direction.

7. The steering system according to claim 6, further comprising
a flexible member connecting said movable member and an end of said cross-member.

8. The steering system according to claim 1, further comprising
damper means for the attachment of said cross-member to said body.

9. The steering system according to claim 8, wherein said damper means is disposed adjacent said outer control arm.

10. The steering system according to claim 8, wherein said damper means includes
a bracket fixed at its center to said cross-member, cylinders on ends of said bracket,
a cylindrical damper in each of said cylinders, and
a rod extending through each of said dampers and connected to said body.

11. The steering system according to claim 1, wherein said suspension means comprises a shock absorber including a spring and a cooperative piston-cylinder arrangement connected between said inner control arm and said body.

12. The steering system according to claim 1, wherein said suspension means is located adjacent said kingpin.

13. The steering system according to claim 1, wherein said kingpin has an axis inclined slightly from the vertical.

14. The steering system according to claim 1, wherein said kingpin includes ball bearings.

15. The steering system according to claim 1, further comprising
a cylindrical bushing on said end of said movable member, said one end of said outer control arm is secured to said bushing for the swinging of said outer control arm in a vertical plane.

16. The steering system according to claim 1, wherein said outer control arm extends parallel to said rear wheel.

17. The steering system according to claim 1, wherein said kingpin is adjacent said wheel.

18. A steering system for a motor vehicle having a body comprising:
a cross-member attached to the body of the motor vehicle in the transverse direction;
a movable member slidably disposed with respect to the cross-member so as to be moved in the transverse direction;
an outer control arm rotatably connected on the movable member so as to swing in a vertical plane;
a shaft secured to the outer control arm;
a wheel of the vehicle rotatably mounted on said shaft;
an inner control arm rotatably supported on the cross-member so as to swing in a vertical plane;
a kingpin rotatably connecting both said control arms with each other so that said outer control arm is swingable in a horizontal plane; amd
means for moving the movable member so that the outer control arm turns about the kingpin for turning the wheel.

19. The steering system according to claim 18, wherein
suspension means engaged with the inner control arm for elastically suspending the body of the motor vehicle.

* * * * *